(12) United States Patent
Koneda et al.

(10) Patent No.: US 6,364,807 B1
(45) Date of Patent: Apr. 2, 2002

(54) CONTROL STRATEGY FOR A HYBRID POWERTRAIN FOR AN AUTOMOTIVE VEHICLE

(75) Inventors: Philip Thomas Koneda, Novi; Thomas William Megli, Dearborn; Alexander O. Gibson, Ann Arbor, all of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/607,829

(22) Filed: Jun. 30, 2000

(51) Int. Cl.[7] .............................. B60K 6/02; B60K 41/02
(52) U.S. Cl. ........................................... 477/5; 180/65.2
(58) Field of Search ........................... 477/5; 180/65.2; 123/179.3

(56) References Cited

U.S. PATENT DOCUMENTS

| | | | |
|---|---|---|---|
| 4,400,997 A | * | 8/1983 | Jiala ............................... 477/5 |
| 4,938,097 A | | 7/1990 | Pierce |
| 5,383,825 A | | 1/1995 | El-Khoury et al. |
| 5,389,046 A | | 2/1995 | Timte et al. |
| 5,514,047 A | | 5/1996 | Tibbles et al. |
| 6,019,698 A | * | 2/2000 | Lawrie et al. ................. 477/5 |
| 6,077,186 A | * | 6/2000 | Kojima et al. ................. 477/5 |

* cited by examiner

Primary Examiner—Sherry Estremsky
(74) Attorney, Agent, or Firm—Frank G. McKenzie

(57) ABSTRACT

A control strategy for a hybrid powertrain for an automotive vehicle comprising an internal combustion engine, a geared transmission mechanism for transmitting driving torque to the vehicle traction wheels, and an electric motor arranged in parallel with respect to the internal combustion engine at the torque input side of the transmission. A friction clutch connects and disconnects the engine from the torque flow path as transitions are made between an electric motor driving mode and an engine driving mode. A mechanical damper is located on the torque input side of the clutch. A transition from the electric motor drive mode to the internal combustion engine drive mode is achieved by controlling the engagement of the clutch using a closed loop clutch pressure modulation strategy and controlling the fuel supply to the engine to effect an engine drive mode without triggering undesirable inertia torque fluctuations in the powertrain.

5 Claims, 4 Drawing Sheets

| FRICTION ELEMENT APPLICATION |||||||
|---|---|---|---|---|---|---|
| GEAR | RC | FC | DC | L/R | 2/4 | RATIO |
| 1ST |  | X |  | X |  | 1ST |
| 2ND |  | X |  |  | X | 2ND |
| 3RD |  | X | X |  |  | 3RD |
| 4TH |  |  | X |  | X | 4TH |
| REV | X |  |  | X |  | 2.310 |
X = ELEMENT TRANSMITS TORQUE
*Fig. 6a*
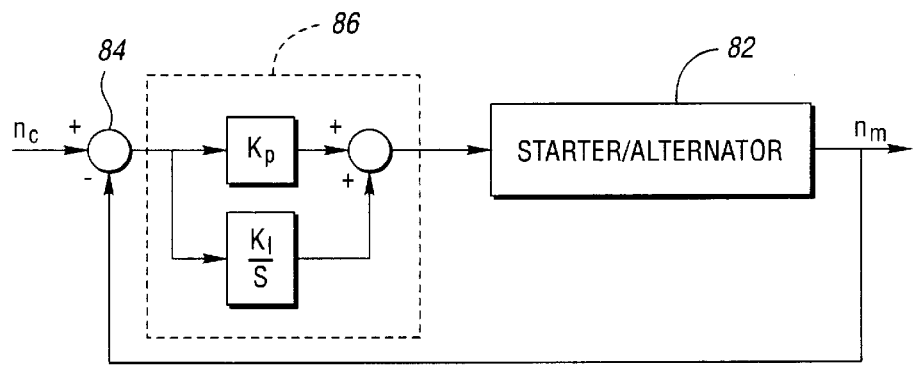
*Fig. 7*
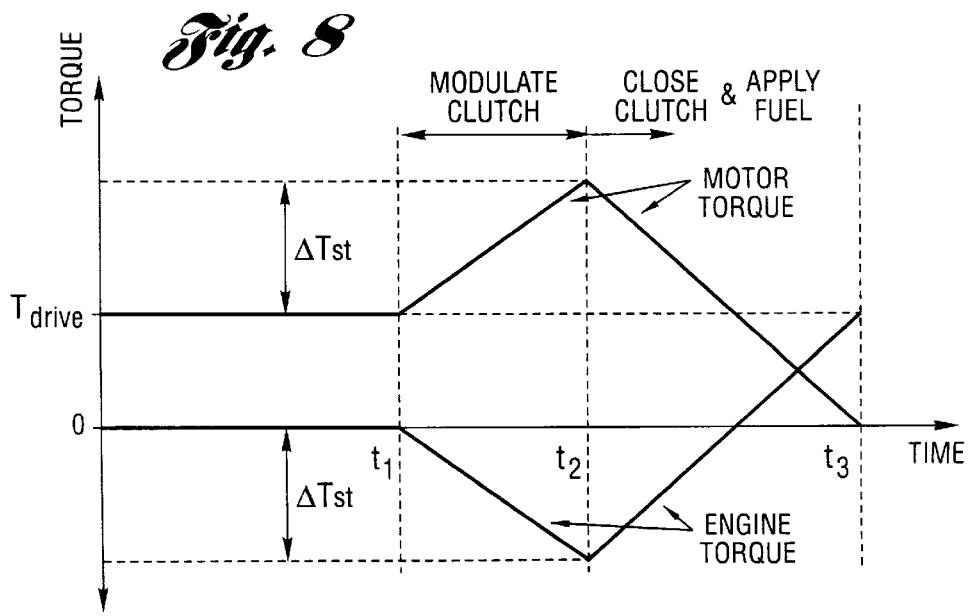
*Fig. 8*

CONTROL STRATEGY FOR A HYBRID POWERTRAIN FOR AN AUTOMOTIVE VEHICLE

TECHNICAL FIELD

This invention relates to hybrid vehicle powertrains having an internal combustion engine and an electric motor as sources of torque wherein engine torque is supplemented with motor torque.

BACKGROUND ART

The fuel economy of an automotive vehicle powertrain having an internal combustion engine can be greatly improved by supplementing engine driving torque with the torque of an electric motor. Such hybrid drivelines also reduce undesirable exhaust gas emissions from the internal combustion engine in comparison to an automotive vehicle driveline in which the engine is the sole source of driving torque.

A hybrid vehicle powertrain of this kind is described, for example, in copending U.S. patent application Ser. No. 09/567,373, filed May 9, 2000, entitled "Motor/Alternator With Integral Wet Clutch For Use In Hybrid Vehicles". Another example of a hybrid vehicle powertrain may be seen by referring to copending U.S. patent application Ser. No. 09/353,290, filed Jul. 15, 1999, entitled "Transmission And Control System For Use With An Engine In A Hybrid Electric Vehicle". Both of these applications are assigned to the assignee of the present invention.

As in the case of the hybrid vehicle powertrains of the copending applications, the electric motor used with the control strategy of the powertrain of the present invention is an induction motor that develops torque to complement engine torque thereby providing added launch performance. Further, during vehicle coast-down, regenerative braking is achieved, which improves fuel economy and makes it possible for the vehicle battery power source for the motor to be charged.

In most conventional automotive vehicle powertrains, a torque converter is used between a multiple-ratio gear system and an internal combustion engine to provide added torque for acceleration and to function as a fluid coupling to attenuate engine torque fluctuations during acceleration as well as during steady-state operation. The control strategy of the present invention makes it possible to attenuate inertia forces in the powertrain during acceleration without the necessity for using a hydrokinetic torque converter. It also makes it possible to effect driving torque management by attenuating the inertia forces during transitions from an electric motor drive mode to an internal combustion engine drive mode.

The parallel torque flow path of the hybrid driveline of the invention makes it possible for the internal combustion engine to be disconnected from the driveline whenever the vehicle stops, or coasts, or operates under low power driving conditions. The electric motor thus can be used in place of the internal combustion engine to drive the vehicle. Energy lost during braking, as mentioned above, also can be partially recovered as the motor is driven by the traction wheels as it functions as a generator for charging the vehicle battery.

The electric motor is available to power the vehicle in parallel relationship with respect to the engine thereby boosting the effective power available during heavy throttle operation.

A friction clutch is located between the electric motor and the internal combustion engine. The strategy of the present invention makes it possible to achieve a smooth transition between the electric motor drive mode and the internal combustion engine drive mode, thereby minimizing disturbances due to inertia forces. The transition of power between the electric motor and the internal combustion engine can be achieved while the vehicle is in motion.

The clutch located between the engine and the electric motor may be used as well to start the internal combustion engine under cold-start operating conditions or when the vehicle battery state of charge is insufficient to provide an acceptable electric motor launch.

DISCLOSURE OF INVENTION

A powertrain that is controlled by the strategy of the present invention includes a pressure-actuated engine clutch between the engine crankshaft and the rotor of a starter motor/alternator. A spring damper is located between the engine and the clutch. During normal driving, the vehicle can be launched electrically using the motor/alternator only. At this time, the engine friction clutch is open, which disconnects the engine from the powertrain. A transition from the electric motor operating mode to the internal combustion engine operating mode is achieved by energizing the clutch. This connects the internal combustion engine to the rotor of the electric motor, which is directly coupled to the transmission input shaft. At this time, the clutch pressure is controlled in accordance with the control strategy of the present invention. Clutch pressure modulation is obtained using this strategy to provide for a smooth power transfer with minimal disturbance due to inertia forces.

During this pressure modulation, the engine clutch will continue to slip until the engine and the electric motor are at nearly the same speed. At that time the engine clutch pressure can be increased, thereby fully applying the clutch to transmit full output torque of the internal combustion engine to the transmission. At the outset, the electric motor accelerates the engine up to the engine startup speed. When the engine startup speed is achieved, the fuel is turned on; but this occurs only after the clutch has been fully applied.

The natural frequency of the spring mass system that comprises the inertia of the rotor, the inertia of the engine, and the spring damper characteristic occurs at speeds that are below the idle speed of the engine. The clutch then operates in a slip mode which prevents damper rattle and large friction clutch torque spikes as the clutch is being engaged. The clutch torque capacity, therefore, need not be designed to accommodate high peak torques.

In accordance with another feature of the invention, the internal combustion engine can be started and the vehicle can be launched from a standing start without using the electric drive system. This is useful when the battery is in a low state of charge. Under these circumstances, the engine may remain in neutral until the engine has reached its idle speed and the driver has moved the transmission selector lever to a drive position. Significant cyclical crankshaft torque reversals during the engine starting mode are avoided and the previously described damper rattle problem will not be present.

The electric motor may act as an inertial starter. In these circumstances, the electric motor freely accelerates up to a target idle speed for the engine. Then the full hydraulic pressure for the clutch is applied following a continuously slipping clutch startup mode. Torque spikes are attenuated just as they are during the previously described transition from the electric motor drive mode to the internal combustion engine drive mode. After the engine reaches its target idle speed and the engine clutch is fully applied, the fuel for the engine can be turned on. The vehicle then can operate using conventional internal combustion engine power.

BRIEF DESCRIPTION OF DRAWINGS

FIG. 6a is a chart showing the clutch and brake engagement and release pattern for achieving each of four forward drive ratios and a single reverse drive ratio for the gearing of FIG. 6;

FIG. 7 is a motor speed control circuit using a proportional-integral feedback for controlling speed error;

FIG. 8 is a plot showing the relationship between engine torque and motor torque during the clutch engagement interval.

BEST MODE FOR CARRYING OUT THE INVENTION

Figure 1:
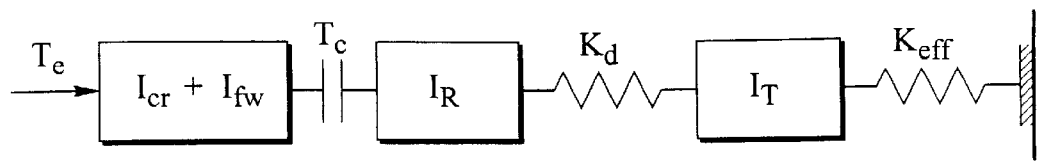
FIG. 1 is a schematic diagram of the dynamics involved in dampening the torque through a powertrain when the engine damper is located between the motor rotor and the transmission torque input shaft.
Figure 2:
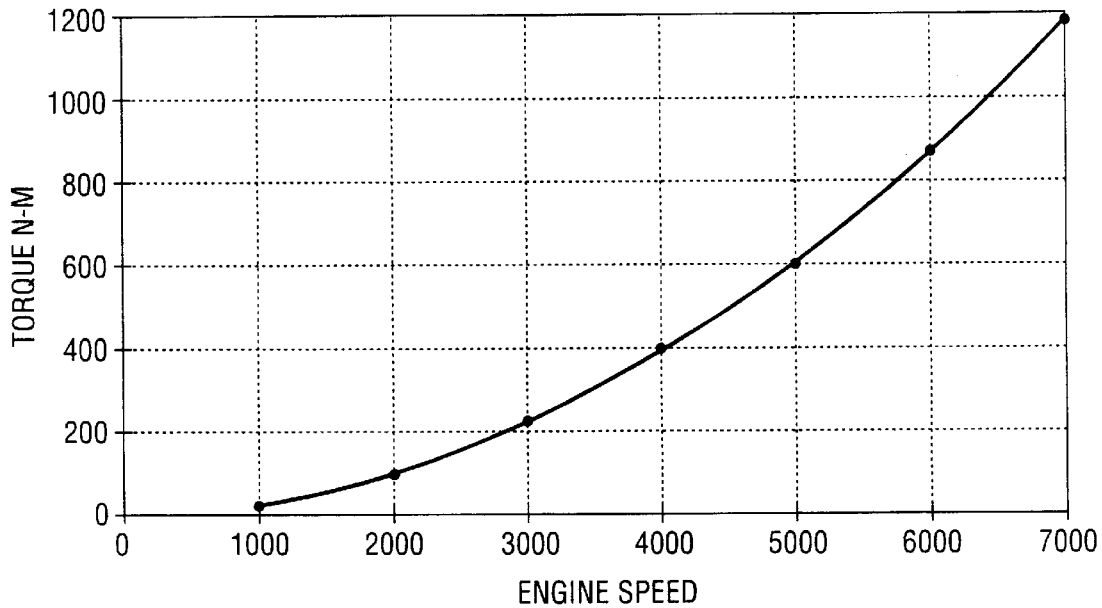
FIG. 2 is a graph showing the relationship of the inertial torque amplitudes for a typical 2.0 liter, in-line, four-cylinder engine as the speed is changed from idle speed to a maximum engine operating speed.

In FIG. 1, the inertia of the engine is comprised of two components. These are the inertia of the crankshaft $I_{cr}$ and the inertia of the flywheel $I_{fw}$ in a driveline in which the clutch ($T_c$) provides a direct connection between the engine and the electric motor rotor ($I_R$) The symbol ($T_e$) represents the engine torque and the symbol ($T_c$) represents the clutch torque. In an arrangement of this type, the clutch must be designed to transmit a large percentage of the peak engine torque (e.g., 65% to 75%), to avoid clutch slip. The peak engine torque level is substantially greater than the cycle average torque of the engine for a typical two-liter, four-cylinder engine. The peak torque pulses from engine firing may be about three or more times the cycle average engine torque at low engine speed. Further, the crankshaft inertial forces arising from the reciprocating masses of the engine (pistons, rings, connecting rods, etc.) will produce a cyclical torque, which is quite large at higher engine speed. This relationship of engine speed to torque is shown in FIG. 2 as the engine speed increases from about 2000 rpm to 6000 rpm. The peak torque level at the crankshaft increases from about 100 N-M to about 900 N-M.

In an arrangement of the kind shown in FIG. 1, the clutch must be designed with a torque capacity of about 650 N-M, which is about four times the maximum engine torque. This makes it necessary to increase the clutch package size or to increase the number of clutch plates, or both. Further, the ability to control the clutch gain would be difficult, which would make smooth clutch engagements difficult.

In the arrangement of FIG. 1, the mechanical damper, shown at $K_d$, is located between the motor and the transmission. The spring effect of the transmission elements and the powertrain itself is represented by the symbol $K_{eff}$.

Figure 3:
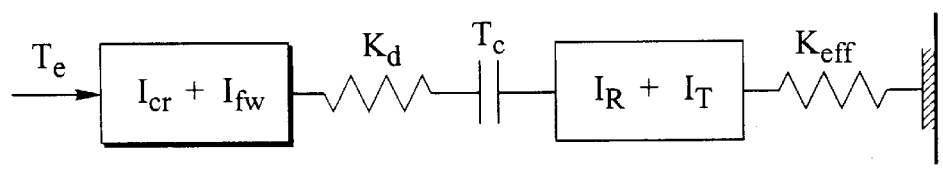
FIG. 3 is a schematic diagram showing the inertial dynamics of a powertrain employing the improvements of the invention wherein the damper is located between the clutch and the engine.

If the arrangement of FIG. 1 is changed so that the damper is located between the clutch and the engine, as shown in FIG. 3, the need for the high torque capacity of the clutch can be eliminated. The damper then would function as a mechanical filter to reduce peak torque transmitted to the clutch.

Figure 6:
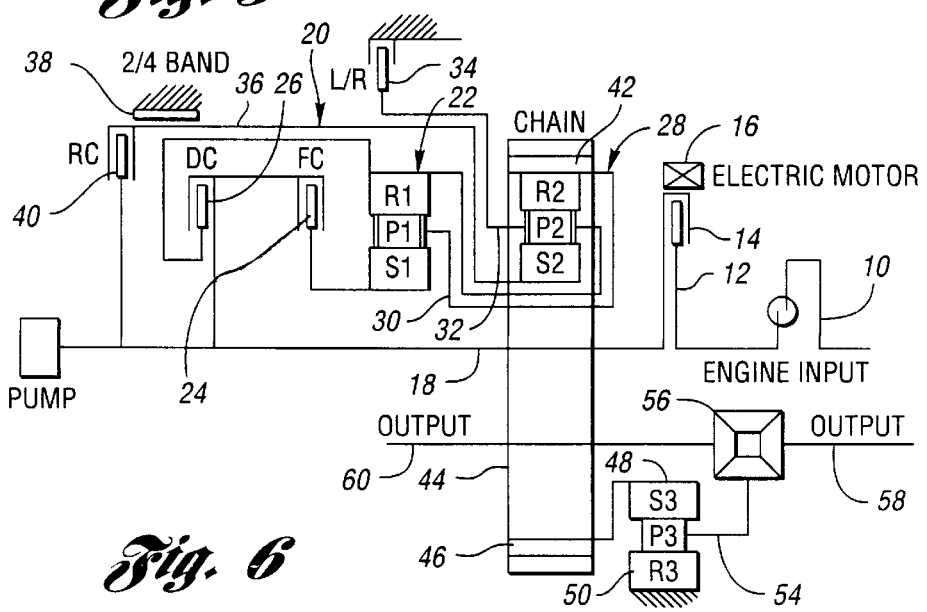
FIG. 6 is a schematic diagram of a gearing arrangement that may be used in a hybrid powertrain employing the control strategy of the invention.

An actual embodiment of a gearing arrangement is shown in schematic form in FIG. 6 together with an electric motor and a mechanical spring damper. These powertrain elements conform to the inertial diagram shown in FIG. 3.

FIG. 6 is a schematic representation of a multiple-ratio transmission that may be used with an internal combustion engine and an electric induction motor in a hybrid powertrain. The engine crankshaft, schematically shown at 10, is connected to clutch plate 12. The rotor 14 of the electric motor and the clutch plate 12 have friction surfaces that are engageable by a pressure-operated clutch actuator of the kind described in the previously identified copending patent application. Electric motor stator 16 surrounds the rotor 14.

Torque transfer shaft 18 of the multiple-ratio transmission 20 is connected directly to the rotor 14. A first simple planetary gear unit 22 of the transmission 20 includes a sun gear $S_1$, which is connected to the torque transfer shaft 18 through a selectively engageable forward-drive friction clutch 24. When the clutch 24 is engaged, the sun gear $S_1$ is connected to the shaft 18, providing a drive connection to the motor.

Gear unit 22 includes a ring gear $R_1$, which is connected to the shaft 18 through the direct-drive clutch 26 when it is engaged.

A second simple planetary gear unit 28 includes a ring gear $R_2$, which is directly connected to carrier 30 for planetary pinions $P_1$ of gear unit 22. The carrier 32 of the gear unit 28 is directly directed to the ring gear $R_1$ of gear unit 22. Carrier 32 can be braked by a low-and-reverse friction brake 34.

Sun gear $S_2$ of the gear unit 28 is connected to brake drum 36 of the ⅔ band brake 38.

During reverse drive, brake drum 36 and sun gear $S_2$ are connected to torque transfer shaft 18 through a selectively engageable reverse-drive friction clutch 40.

Ring gear $R_2$ of the gear unit 28 is connected to or forms a part of a drive chain sprocket 42. The drive chain 44 connects the sprocket 42 to torque output sprocket 46, which is connected drivably to the sun gear 48 of a final drive planetary gear unit. Ring gear 50 ($R_3$) is fixed to the transmission housing. The carrier 54 of the planetary gear unit journals pinions $P_3$ as shown at 54. Carrier 54 is connected to the differential gear unit 56, which has bevel pinions that deliver torque through differential side gears to each of two transmission output half shafts 58 and 60.

The chart of FIG. 6a shows the friction elements that must be engaged and released to establish each of four forward-driving ratios and a single reverse ratio. The symbol "X"

indicates the various friction elements that are applied for each of the transmission ratios. First ratio is obtained by applying the forward clutch 24 and the low-and-reverse brake band 34 as driving torque is applied to the torque input shaft 18. Sun gear S acts as a torque input element, and carrier 32 acts as a reaction element.

The forward clutch 24 is applied during operation in each of the first three forward-driving ratios. Both clutch 24 and clutch 26 are applied during direct-drive operation (third gear) so that all of the elements of the gearing rotate in unison.

The fourth forward-driving ratio is an overdrive ratio with brake band 38 applied. Sun gear $S_2$ acts as a reaction element as torque is delivered to the carrier 32 through the direct clutch 26.

During reverse drive, torque is delivered through the reverse clutch to the sun gear $S_2$, which causes reverse motion to be imparted to the ring gear $R_2$ and the drive chain 44 as the carrier 32 acts as a reaction element.

Figure 5:
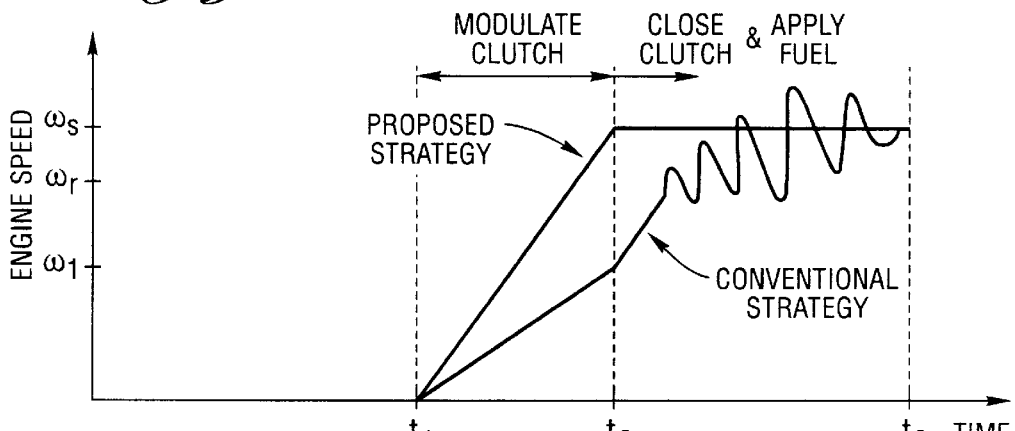
FIG. 5 is a plot of the engine speed versus clutch engagement time during a transition from the electric motor drive mode to an internal combustion engine drive mode for both the improved strategy of the invention as well as a conventional clutch engagement strategy.

FIGS. 5 and 8 show the sequence of events carried out by the control strategy during a power transition from the motor to the engine. Engine speed is plotted against time elapsed during the drive mode transition shown in FIG. 5.

In the interval between time $t_0$ and $t_1$, the vehicle is being propelled by the electric motor only. The motor is under torque control at that time. That is, the electronic powertrain controller receives a signal from a throttle position sensor. Using information stored in the controller memory, the throttle position indicates the commanded torque as a function of throttle position.

At time $t_1$, the controller receives a signal to change power sources; that is, the controller is commanded to change from electric motor drive to engine drive. At that instant, the electric motor is placed under speed control to hold the output torque to the drive wheels constant. The engine clutch begins to apply at time $t_1$. The controller modulates the pressure applied to the clutch in the interval between $t_1$ and $t_2$, the apply pressure being determined as a function of motor speed. During that interval, the engine speed is compared to electric motor speed and the pressure applied to the clutch is varied accordingly.

At time $t_2$, the engine speed and the motor speed become equal. The symbol $\omega_s$ in FIG. 5 indicates the motor starting speed.

During the interval between time $t_2$ and time $t_3$, the engine speed is equal, or nearly equal, to the speed of the electric motor. The clutch at that time is fully engaged by applying full clutch pressure. The clutch no longer slips as it did during the interval between time $t_1$ and time $t_2$. When the clutch is fully engaged, engine fueling is initiated. This allows the engine to provide positive driving torque.

The electric motor, during the time interval from $t_2$ to $t_3$, continues to operate under speed control, thereby maintaining a constant drive torque to the wheels until the engine torque reaches a commanded torque. When the motor torque finally is reduced to zero, the mode change is complete since the engine torque at that instant is equal to the commanded engine torque. The controller thereafter returns to torque control as the speed control is interrupted.

FIG. 5 shows a comparison between the control strategy of the present invention with a conventional strategy for applying a clutch in a hybrid driveline. The resonant frequency of the powertrain is indicated by the symbol $\omega_r$. The symbol $\omega_1$ in FIG. 5 indicates the engine speed at the instant the clutch is engaged. In the strategy of the present invention, the engine is started by applying the clutch at time $t_1$ while the electric motor is in the speed control mode with the motor speed equal to the engine starting speed. The starting speed $\omega_s$ is greater than the resonant speed $\omega_r$, which is the resonant speed of the dual mass flywheel system described with reference to FIG. 3. The dual mass flywheel system is formed by the engine inertia, the rotor inertia, the torsional damper and the rotary elements of the transmission.

In the case of a conventional strategy, the engine speed $\omega_1$ is substantially lower than the resonant speed $\omega_r$. Since the starting speed is less than the resonant speed and the clutch is fully locked at time $t_2$ when the engine is started, damper rattle and torsional vibrations are introduced as the system passes through resonance. This is shown by the oscillating engine speed plot of FIG. 5.

FIG. 8 shows the motor and engine output torque plotted as a function of time for the strategy of the invention. During the engagement, the starter/alternator is in the speed control mode, as indicated previously. Initially, the electric motor maintains a drive torque $T_{DRIVE}$, which is determined by the throttle position. At time $t_1$, the motor torque increases to offset the negative engine torque required to accelerate the engine up to the rotor speed corresponding to the engine starting speed during the engagement period. After time $t_2$, fuel is injected and the engine begins to produce positive torque. As the engine torque increases, the motor torque decreases, as indicated by the companion plots of engine torque and motor torque in FIG. 8. The motor torque decreases in order to maintain a constant speed. The sum of the engine torque and the motor torque remains constant for the driver-demanded torque level $T_{DRIVE}$. This prevents any noticeable disturbance in the vehicle acceleration.

If the battery is in a low state of charge, the battery may not be capable of developing full motor torque. Thus, at the outset of the vehicle launch, it will be necessary to start the engine and then launch the vehicle from rest without using the electric drive system. During this engine start, the transmission will remain in neutral with the forward clutch disengaged until the internal combustion engine has reached its final speed and the driver has moved the transmission selector lever to a drive position. If the engine clutch is applied during this engine start mode with the electric motor acting as a conventional starter motor, dual mass flywheel torque fluctuations will occur since the internal combustion engine will be driven through the spring damper. Gas pressure forces generated during the engine motoring produce significant cyclical crankshaft torque levels, which would excite resonances. These torque fluctuations are shown, for example, in FIG. 4.

Figure 4:
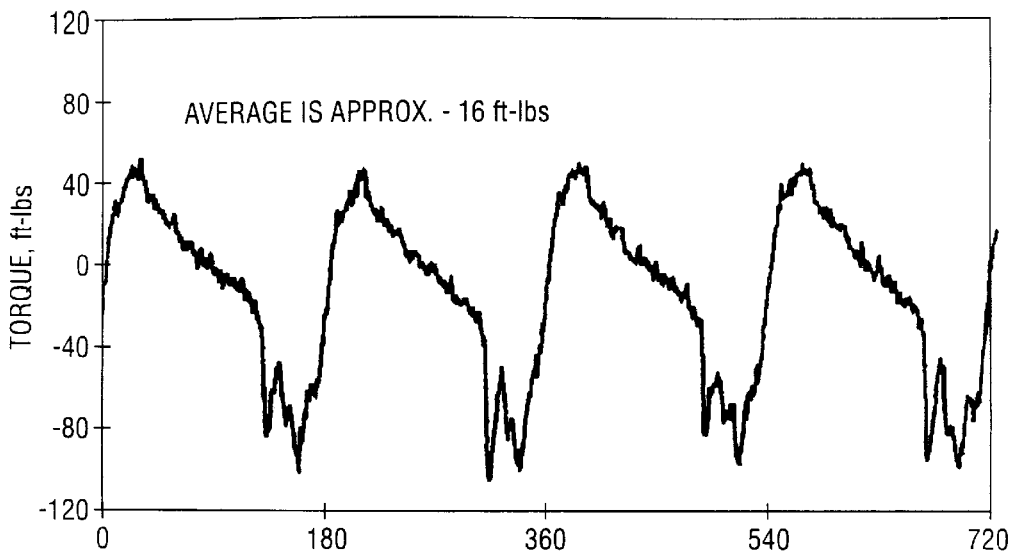
FIG. 4 shows typical motoring torque fluctuations as a function of crank angle for a conventional internal combustion vehicle engine.

The plot of FIG. 4 is a typical motoring torque plot as a function of crank angle. The average torque level for a two-liter, four-cylinder engine is about −15 lbs.-ft. The maximum level is 40 lbs.-ft. during expansion strokes. The minimum is roughly −100 lbs.-ft. during compression strokes. The engine will produce significant torsional reversals at some point during acceleration, which excite one of the torsional resonances. This may cause damper rattle or possibly damper failure.

Unlike the condition described with reference to FIG. 4, using the electric motor as an inertial starter with the strategy of the present invention makes it possible for the motor to freely accelerate the engine up to the target idle speed. Hydraulic pressure is used to smoothly apply the clutch as the clutch continuously slips during this engine startup. The slipping of the clutch attenuates torque spikes. As in the case of the power transmission mode previously described, the internal combustion engine, after it reaches the target idle speed, can be fueled in the usual way so that the vehicle may be powered under conventional internal combustion engine power.

Figure 9:
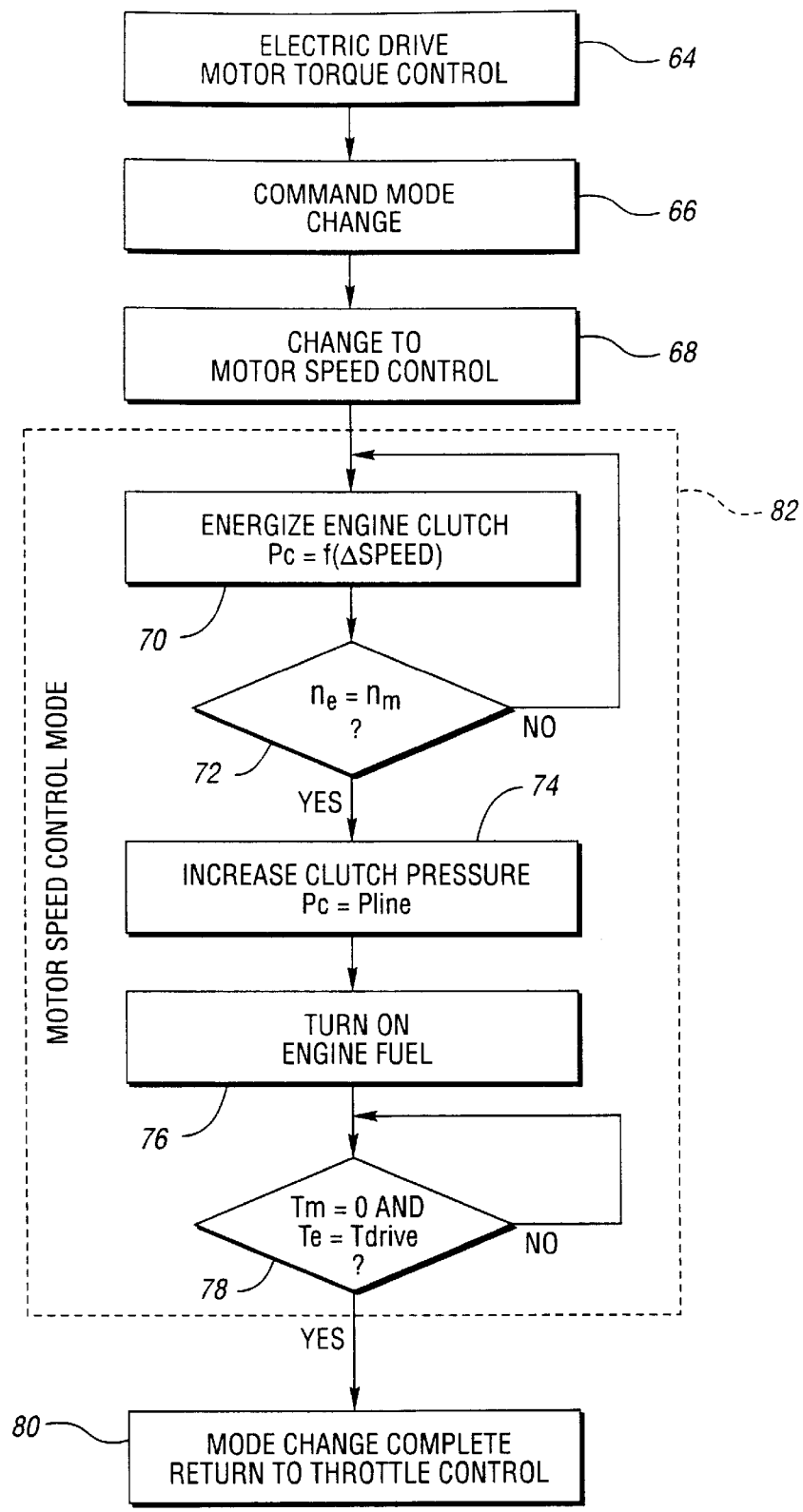
FIG. 9 is a flow diagram illustrating the control strategy for engaging the engine clutch during a transition from the motor drive mode to the internal combustion engine drive mode.

FIG. 9 is a flowchart that summarizes the control strategy described previously for a transition from motor power to engine power. When the powertrain transition time is at $t_0$, as seen in FIG. 5, the powertrain is in electric drive motor torque control as shown at action block 64 in FIG. 9. When the operator commands a change in mode from the motor drive mode to the engine drive mode, which occurs at time $t_1$, that change is demonstrated by action block 66.

The next step in the strategy of FIG. 9 is to change to motor speed control, as shown at 68. The clutch is energized beginning at time $t_1$ and continuing to time $t_2$. The pressure on the clutch is modulated to achieve clutch slip, the pressure being a function of the difference in the commanded speed of the engine and the actual speed. This is seen at action block 70.

At step 72, a comparison is made between the motor speed and the engine speed. If the motor speed does not equal engine speed, clutch pressure modulation will continue. If the engine speed equals motor speed, the routine will proceed to action block 74, which calls for an increase in the clutch pressure to occur so that clutch pressure will equal full line pressure. At that point, the engine fuel can be turned on, as seen at action block 76.

As engine torque begins to increase, the torque of the engine and the torque of the motor are monitored. The torque of the motor approaches zero as the torque of the engine approaches commanded drive torque as determined by throttle position. After the torque of the engine achieves the commanded torque, the mode change from motor drive to engine drive is complete. The system then will return to throttle control, as indicated at action block 80 as the motor speed control mode terminates.

FIG. 7 shows the electric motor (starter/alternator) speed control circuit, which is effective during the speed control portion of the flow diagram of FIG. 8, as indicated at 82. In FIG. 7, the commanded speed ($n_c$) is compared to the measured motor speed ($n_m$) at summing point 84. A difference in the two speeds passes through a proportional gain and integral gain circuit, as shown at 86. The proportional gain factor is $K_P$, and the integral gain factor is $K_I$. The term "S" is a LaPlace transfer function operator, which modifies the integral gain term in the circuit 84. The output of the circuit 84 is delivered to the motor/alternator speed control 82.

Although a preferred embodiment of the invention has been described, modifications may be made by persons skilled in the art without departing from the scope of the invention. All such modifications and equivalents thereof are intended to be within the scope of the following claims.

What is claimed is:

1. A control strategy and method for controlling a pressure-operated engine clutch in a throttle-controlled, hybrid powertrain for an automotive vehicle, the clutch being located at the torque input side of a multiple-ratio power transmission mechanism, the powertrain including a throttle-controlled internal combustion engine and a mechanical spring damper located in a torque flow path between the engine and the clutch, the torque output side of the transmission being connected drivably to traction wheels for the vehicle, and an electric motor in the torque flow path between the damper and the torque input side of the transmission, the strategy and method comprising the steps of:

launching the vehicle from a standing start by disengaging the clutch and energizing the electric motor while the clutch is disengaged;

controlling the motor using a motor torque control wherein electric power supplied to the motor is a function of throttle position, the throttle position being an indication of commanded torque;

commanding a transition from a motor power mode to an engine power mode during a transition time interval;

partially energizing the clutch at the beginning of the transition time interval;

modulating the pressure applied to the clutch to effect slipping of the clutch during the transition time interval, the clutch pressure being a function of the difference between clutch speed and engine starting speed whereby the motor is in a speed control mode;

applying full clutch pressure to the clutch when engine starting speed is approximately equal to motor speed; and activating engine fueling.

2. The strategy and method set forth in claim 1 including the steps of monitoring commanded engine torque based on throttle position and monitoring motor torque as engine torque increases, and effecting torque delivery through the driveline using throttle control and terminating speed control as the vehicle is powered using engine power solely.

3. The control strategy and method set forth in claim 2 wherein the engine starting speed is greater than powertrain resonant speed of the powertrain system defined by the mass of engine rotary members, the mass of the motor rotary members and the spring damper characteristic of the mechanical spring damper.

4. The control strategy and method set forth in claim 1 wherein the engine starting speed is greater than powertrain resonant speed of the powertrain system defined by the mass of engine rotary members, the mass of the motor rotary members and the spring damper characteristic of the mechanical spring damper.

5. A control strategy and method for controlling a pressure-operated engine clutch in a throttle-controlled, hybrid powertrain for an automotive vehicle, the clutch being located at the torque input side of a multiple-ratio power transmission mechanism, the powertrain including a throttle controlled internal combustion engine and a mechanical spring damper located in a torque flow path between the engine and the clutch, throttle position being an indicator of commanded powertrain torque, the torque output side of the transmission being connected to traction wheels for the vehicle, and an electric motor in the torque flow path between the damper and the torque input side of the transmission, the strategy and method comprising the steps of:

starting the engine using the electric motor as a starter motor when the vehicle is stationary prior to launch of the vehicle using engine power solely;

the step of starting the engine comprising partially engaging the clutch when the vehicle is stationary;

modulating pressure of the clutch using closed-loop feedback motor speed control whereby pressure of the clutch is proportional to the difference between commanded engine starting speed and actual clutch speed as the clutch slips thereby attenuating inertial torque disturbances;

engaging the clutch fully when the clutch speed is approximately equal to engine starting speed; and effecting fueling of the engine after the clutch is fully engaged.

* * * * *

UNITED STATES PATENT AND TRADEMARK OFFICE
CERTIFICATE OF CORRECTION

PATENT NO.    : 6,364,807 B1             Page 1 of 1
DATED         : April 2, 2002
INVENTOR(S)   : Koneda et al.

It is certified that error appears in the above-identified patent and that said Letters Patent is hereby corrected as shown below:

Title page,
Item [*] Notice, delete the phrase "by 0 days" and insert -- by 18 days --

Signed and Sealed this

Twelfth Day of October, 2004

JON W. DUDAS
*Director of the United States Patent and Trademark Office*